(12) United States Patent
Forestelli

(10) Patent No.: US 11,486,780 B2
(45) Date of Patent: Nov. 1, 2022

(54) METHOD AND APPARATUS FOR DETECTING THE ANGULAR POSITION OF A CAP WITH RESPECT TO A BOTTLE

(71) Applicant: FT SYSTEM SRL, Alseno (IT)

(72) Inventor: Fabio Forestelli, Alseno (IT)

(73) Assignee: FT SYSTEM SRL, Alseno (IT)

(*) Notice: Subject to any disclaimer, the term of this patent is extended or adjusted under 35 U.S.C. 154(b) by 289 days.

(21) Appl. No.: 16/635,630

(22) PCT Filed: Jul. 31, 2018

(86) PCT No.: PCT/IB2018/055707
§ 371 (c)(1),
(2) Date: Jan. 31, 2020

(87) PCT Pub. No.: WO2019/025956
PCT Pub. Date: Feb. 7, 2019

(65) Prior Publication Data
US 2021/0131895 A1     May 6, 2021

(30) Foreign Application Priority Data
Aug. 2, 2017 (IT) .......................... 102017000089270

(51) Int. Cl.
*G01L 5/24* (2006.01)
*G06T 7/285* (2017.01)
(Continued)

(52) U.S. Cl.
CPC ............. *G01L 5/24* (2013.01); *G06T 5/002* (2013.01); *G06T 7/001* (2013.01); *G06T 7/248* (2017.01);
(Continued)

(58) Field of Classification Search
CPC ..... B01D 41/04; B01D 46/0046; B01D 46/04; B01D 46/2411; B01D 46/446; B01D 46/521; B01D 46/71
See application file for complete search history.

(56) References Cited

U.S. PATENT DOCUMENTS 3,828,962 A * 8/1974 Atkins ................... B65D 41/17
                                                        215/382
5,116,395 A * 5/1992 Williams ............... B01D 46/71
                                                        96/426
(Continued)

FOREIGN PATENT DOCUMENTS

JP          2009008637 A      1/2009

OTHER PUBLICATIONS

A glass Bottle Detect Detection System without Touching, 2002, Hui-Min Ma (Year: 2002).*
(Continued)

*Primary Examiner* — Ming Wu
(74) *Attorney, Agent, or Firm* — Howson & Howson LLP (57) ABSTRACT

A method for detecting the angular position of a cap with respect to a bottle is provided. A first image of a cap provided with a first marker and of at least a portion of the bottle with which the cap is associated and which is provided with a second marker is captured. Liquid drops and other possible impurities existing thereon are removed from and/or displaced relative to the cap and bottle portion. A second image of the cap and bottle portion is then captured. The first image and second image are compared to obtain at least one processing which is free from "noise" and interferences due to the liquid drops and on which the positions of the first and second markers can be determined without errors. The relative angular position of the first and second markers are (Continued)

determined. An apparatus suitable to implement the aforesaid method is also provided.

12 Claims, 6 Drawing Sheets (51) Int. Cl.
  *G06T 7/246* (2017.01)
  *G06T 5/00* (2006.01)
  *G06T 7/00* (2017.01)
(52) U.S. Cl.
  CPC .... *G06T 7/285* (2017.01); *G06T 2207/30204* (2013.01)

(56) References Cited

U.S. PATENT DOCUMENTS

| | | | |
|---|---|---|---|
| 5,422,476 A * | 6/1995 | Weber | G01N 21/9009 209/524 |
| 6,643,009 B2 | 11/2003 | Takakusaki et al. | |
| 7,025,811 B2 * | 4/2006 | Streichsbier | B01D 41/04 55/482 |
| 9,417,145 B2 | 8/2016 | Cochran et al. | |
| 11,279,911 B2 * | 3/2022 | Kamiya | C12M 23/46 |
| 2012/0223968 A1 * | 9/2012 | Kashimoto | G06T 19/006 345/633 |

OTHER PUBLICATIONS

A glass Bottle Detect Detection System without Touching, 2002 (Year: 2002).*

International Search Report and Written Opinion of the International Searching Authority dated Oct. 24, 2018 for International Patent Application No. PCT/IB2018/055707.

Hui-Min Ma et al., "A glass bottle defect detection system without touching" Machine Learning and Cybernetics, IEEE, Nov. 2002 (Abstract only).

* cited by examiner

METHOD AND APPARATUS FOR DETECTING THE ANGULAR POSITION OF A CAP WITH RESPECT TO A BOTTLE

TECHNICAL FIELD

The present invention relates to a method for detecting the angular position of a cap with respect to a bottle, more particularly for detecting the angular position of a cap with respect to a bottle made of plastics and having a threaded neck.

The present invention also relates to an apparatus suitable to implement the aforesaid method.

The invention finds application in particular in inspection systems for verifying the closing torque of a cap on a corresponding bottle.

PRIOR ART

Bottling systems are known in which bottles of plastic material are filled with a desired liquid and are subsequently closed by means of a cap.

Generally speaking, said bottles of plastic material have a neck provided with a thread and, after having been filled, they are closed by means of a screw cap having an inner thread which is screwed on the thread of the neck of a respective bottle.

To this end, said bottling systems include a capping station in which said caps are applied to said bottles by means of a suitable capping apparatus screwing each cap on the threaded neck of the corresponding bottle.

According to the prior art, said bottling systems further include, downstream of said capping station in the advance direction of the bottles, an inspection station in which the closing torque of each cap on the corresponding bottle is measured and compared to a reference value (o value range) in order to determine whether said closing torque complies with predetermined standards.

Indeed, too high a closing torque can result in the users encountering a certain difficulty for removing the cap, especially in case of aged persons. On the other hand, too low a closing torque can result in an incorrect closure of the container, with a consequent risk of losses and/or deterioration of the liquid contained in the bottles.

To this end, it is known to provide a suitable marker on the bottle, for instance on the ring (the so-called ledge) at the base of the bottle neck, and a corresponding marker on the screw cap, so that the closing torque of the screw cap on the bottle neck can be determined by comparing the relative angular position of said markers.

From the state of the art, inspection apparatuses are known which are capable of: capturing an image of the screw cap and of at least a portion of the bottle the cap is associated with; analysing said image in order to detect a first marker provided on said screw cap and a second marker provided on said bottle (e.g. on the ledge of the neck of said bottle); and determining the relative angular position of said markers.

Thereafter, it will be possible to calculate, according to said relative angular position, the closing torque of the cap on the bottle neck and to compare the calculated value of the closing torque to a predetermined reference value or value range. In case said comparison does not give the desired result, the bottle is discarded and removed from the bottling line.

An inspection apparatus of the kind described above is known for instance from document U.S. Pat. No. 6,643,009.

In the alternative, from the state of the art inspection apparatuses are known which are capable of: capturing a first image of the screw cap and of a corresponding first marker provided thereon; capturing a second image of at least a portion of the bottle and of a corresponding second marker provided thereon (e.g. on the ledge of the neck of said bottle); and comparing said first and second images in order to determine the relative angular position of said first and said second markers.

Thereafter, also in this case it will be possible to calculate, according to said relative angular position, the closing torque of the cap on the bottle neck and to compare the calculated value of the closing torque to a predetermined reference value or value range.

An inspection apparatus of the kind described above is known for instance from document U.S. Pat. No. 9,417,145.

Yet, both kinds of inspection apparatuses described above, as well as the method they implement, are subject to high margins of error and consequently have a limited efficiency.

This is mainly due to the fact that, owing to the different operations the bottles and the corresponding caps undergo before reaching the inspection station (with reference in particular, but not exclusively, to the filling of the bottles with the corresponding liquid), the surface of said bottles and said caps are not perfectly clean, but are on the contrary covered with impurities, especially liquid drops, that can make difficult the correct identification of the makers provided on the bottles and the corresponding caps, respectively.

This problem is enhanced by the fact that, for reasons of safety of the consumer, said markers must not protrude or be sharp. Moreover, for marketing reasons, they must be scarcely noticeable, in order they do not negatively affect the aesthetic appearance of the final product and its appeal on the consumer.

Consequently, the prior art methods and apparatuses are not capable of determining in unambiguous manner the actual positions of said markers and hence the actual angular positions of the caps with respect to the respective bottles and, ultimately, the actual value of the closing torque.

It is therefore the main object of the present invention to overcome the drawbacks and the limitations of the prior art, by providing a method and an apparatus in which the errors in the determination of the angular position of a cap with respect to a corresponding bottle are eliminated.

More particularly, it is an object of the invention to provide a method and an apparatus in which the angular position of a cap with respect to a corresponding bottle is determined according to the detection of respective markers provided on said cap and said bottle and in which the errors in the detection of the positions of said markers are eliminated.

The above and other objects are achieved by the method and the apparatus as claimed in the appended claims.

SYNTHETIC DISCLOSURE OF THE INVENTION

The method according to the invention comprises at least the steps of:
capturing at least one first image of the cap and of at least a portion of the bottle with which the cap is associated;
removing from said cap and said at least a bottle portion and/or displacing relative to the cap and the bottle portion the impurities (e.g. liquid drops) existing thereon;

capturing at least one second image of said cap and said at least a bottle portion;

comparing said at least one first image and said at least one second image in order to detect the position of a first marker provided on said cap and the position of a second marker provided on said bottle portion; and determining the relative angular position of said first and said second marker.

Said relative angular position can be advantageously exploited to calculate the value of the closing torque of said cap on said bottle, which value can then be compared to pre-set reference standards.

Preferably, the bottle portion of which at least one first image and at least one second image are captured is the neck portion of the bottles, and the second marker is provided on the bottle neck, in particular on the ledge at the base of the bottle neck.

Thanks to the fact that at least one first image and at least one second image of the cap and the bottle portion are captured and that the cap and the bottle portion are submitted to a cleaning operation between the capture of said at least one first image and the capture of said at least one second image, the "noise" represented by the presence of liquid drops and possible other impurities can be effectively eliminated, and the errors in the determination of the correct positions of the first marker provided on the cap and the second marker provided on the bottle portion can be eliminated.

In a preferred embodiment of the invention, the removal and/or displacement of the liquid drops and possible other impurities from the cap and the bottle is mechanically performed, in particular by means of one or more suitably directed air jets.

Use of one or more air jets directed against the surfaces of the cap and the bottle is particularly advantageous. Even if such jets are not sufficiently strong to wholly remove the liquid drops from the surfaces of the cap and the bottle, they will however produce a displacement of said drops, thereby allowing in any case the correct determination of the positions of the markers (which, clearly, will not be displaced by the air jets).

In a preferred embodiment of the invention, the method comprises the steps of:

capturing a first image of the cap and the bottle portion;

removing from said cap and said bottle portion and/or displacing relative to the cap and the bottle portion the impurities existing thereon;

capturing a second image of said cap and said bottle portion;

comparing said first image and said second image in order to determine the positions of the first and the second marker; and determining the relative angular position of said first and said second marker.

In another preferred embodiment of the invention, the method comprises the steps of:

capturing a first image of the cap and a separate first image of the bottle portion;

removing from said cap and said bottle portion and/or displacing relative to the cap and the bottle portion the impurities existing thereon;

capturing a second image of said cap and a separate second image of said bottle portion;

comparing said first image of said cap and said second image of said cap in order to determine the position of the first marker;

comparing said first image of said bottle portion and said second image of said bottle portion in order to determine the position of the second marker; and determining the relative angular position of said first and said second marker.

Advantageously, according to the latter embodiment of the invention, it is possible to use specific settings, different from one another, to obtain said first and said second image of the cap and said first and said second image of the bottle portion, said settings being selected every time in order to obtain optimised images of the corresponding markers.

Correspondingly, the apparatus according to the invention includes:

an image capturing device, comprising means for capturing at least one first image of the cap and of at least a portion of the bottle with which the cap is associated, as well as at least one second image of said cap and said at least a bottle portion;

a cleaning device arranged to remove from said cap and from said at least a bottle portion and/or to displace relative to the cap and the bottle portion, between the capture of said at least one first image and the capture of said at least one second image, the impurities (e.g. liquid drops) existing thereon; and a processing unit for comparing said at least one first image and said at least one second image in order to determine the position of a first marker provided on said cap and the position of a second marker provided on said bottle portion, and for determining the relative angular position of said first and said second marker.

In a preferred embodiment of the invention, said cleaning device includes one or more nozzles arranged to direct corresponding air jets against the surfaces of the cap and the bottle portion.

In a preferred embodiment of the invention, the image capturing device includes a camera arranged to capture at least one first image of the cap and the bottle portion and also arranged to capture at least one second image of said cap and said bottle portion.

In a particularly preferred variant of said embodiment of the invention, said camera is arranged to capture a first image of the cap and a separate first image of the bottle portion and is also arranged to capture a second image of said cap and a separate second image of said bottle portion.

In another preferred embodiment of the invention, the image capturing device includes a first camera arranged to capture at least one first image of the cap and the bottle portion and at least a second camera arranged to capture a second image of said cap and said bottle portion.

In a particularly preferred variant of said embodiment of the invention, said first camera is arranged to capture a first image of the cap and a separate first image of the bottle portion and said second camera is arranged to capture a second image of said cap and a separate second image of said bottle portion.

BRIEF DESCRIPTION OF THE DRAWINGS

Further features and advantages of the invention will become more apparent from the detailed description of some preferred embodiments of the invention, given by way of non-limiting examples with reference to the accompanying drawings, in which.

DESCRIPTION OF PREFERRED EMBODIMENTS OF THE INVENTION

Figure 1A:
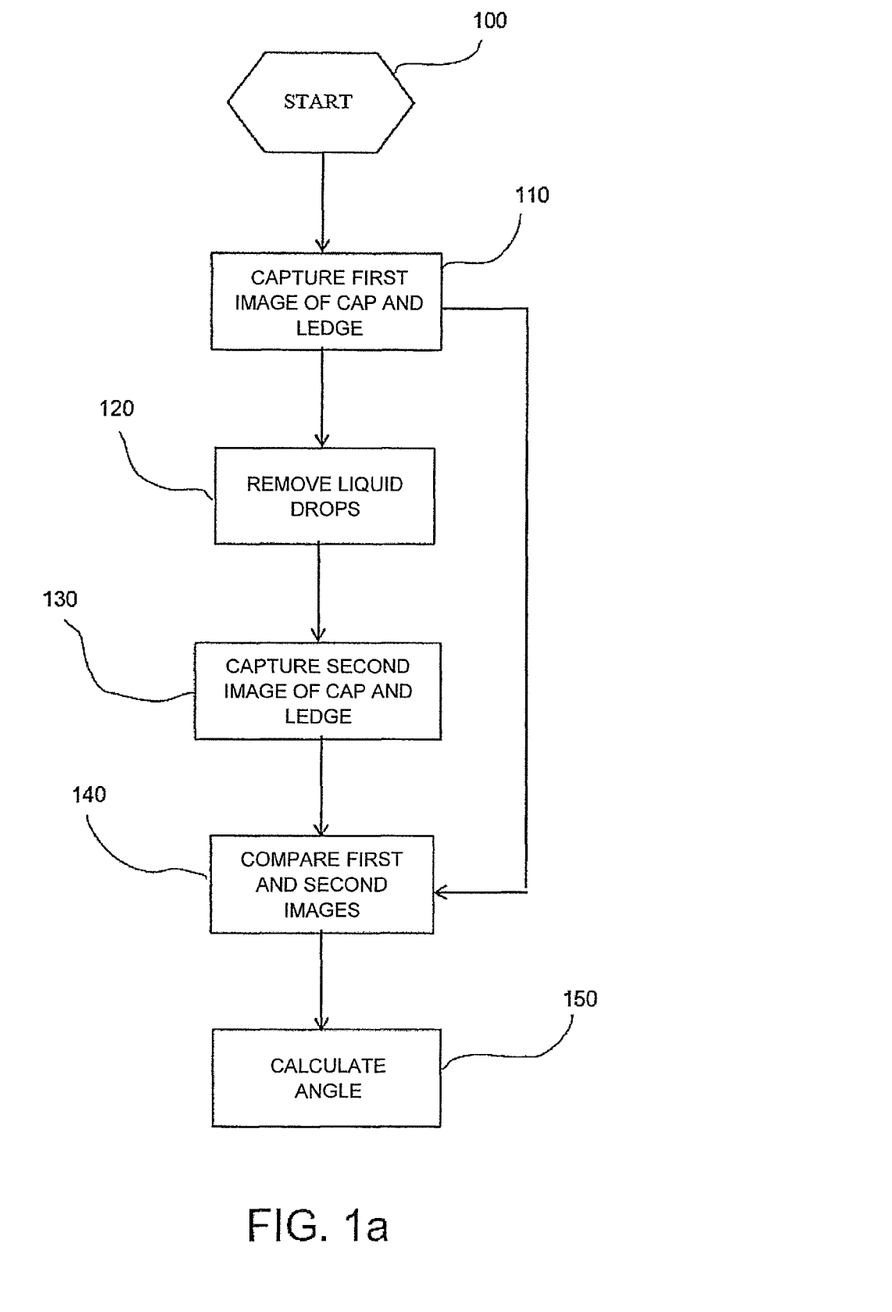
FIG. 1a is a block diagram illustrating the steps of the method for detecting the angular position of a cap with respect to a bottle according to a first embodiment of the invention.
Figure 1B:
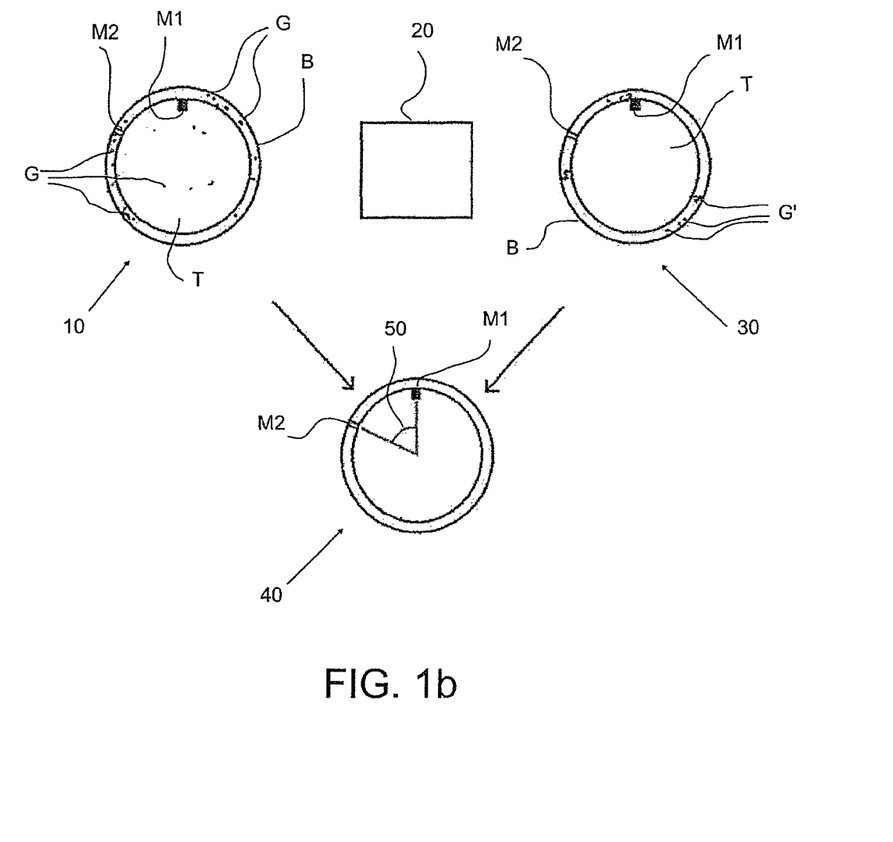
FIG. 1b shows, in the form of pictograms, the steps of the method shown in FIG. 1.

Referring first to FIGS. 1a and 1b, there are schematically shown the main steps of a first embodiment of the method according to the invention for detecting the angular position of a cap T with respect to the bottle on which it is applied.

More particularly, cap T is a screw cap having an inner thread, and the bottle is a bottle of plastic material having a neck provided with a thread.

In a manner known per se, in order to detect the angular position of cap T with respect to the corresponding bottle, a first marker M1 is provided on the cap surface, and a second marker M2 is provided on the bottle surface, for instance on ledge B at the base of the bottle neck.

It will be clearly apparent to the skilled in the art that providing the second marker M2 on ledge B, or anyway in the region of the bottle neck, is advantageous in that it is possible to capture a single image in which both the cap and the bottle portion bearing such a second marker are present. However, it will also be clearly apparent to the skilled in the art that such an arrangement is not to be intended in a limiting sense, and that the second marker could even be located in another portion of the bottle.

In a first step 100 of the method according to the invention, the process of detecting the angular position of cap T is started.

For instance, it is possible to suppose that the bottles with the associated caps advance in line on a transport line of a bottling system, and that said bottling system is equipped with a photocell or similar sensor in order to signal that the bottle to be inspected is in the proper position.

In a second step 110, a first image 10 of cap T and ledge B of the bottle is captured. As it can be seen in FIG. 1b, in this step a plurality of liquid drops G and possibly of other impurities are present on cap T and ledge B, and said liquid drops G will be reproduced in said first image 10. FIG. 1b also shows how correctly detecting the actual positions of the first and second markers M1, M2 is difficult and subject to high margins of error.

According to the invention, in a third step 120 liquid drops G and the other impurities are removed from cap T and ledge B of the bottle.

Preferably, said liquid drops G are removed by means of a mechanical action by a cleaning device 20, for instance by directing one or more air jets against said cap and said ledge.

In a fourth step 130, a second image 30 of cap T and ledge B of the bottle is captured.

As it can be seen in FIG. 1b, in this step many of the liquid drops G previously existing on cap T and ledge B have been removed. Moreover, even if the liquid drops have not been wholly removed in the cleaning step, anyway the remaining liquid drops G' have been displaced by the air jets of cleaning device 20.

In a fifth step 140, the first image 10 of cap T and ledge B of the bottle and the second image 30 of cap T and ledge B of the bottle are compared, and a processing 40 of the image of cap T and ledge B of the bottle is generated.

Thanks to the removal of the liquid drops and the other impurities, any "noise" or interference in the detection of the positions of markers M1, M2 (which "noise" or interference is present in the first image 10 and, to a lesser extent, in the second image 30) is wholly eliminated.

Consequently, in a sixth step 150, the position of the first marker M1 on cap T and the position of the second marker M2 on ledge B of the bottle can be detected from processing 40 without risk of error, and angle 50 between said markers M1, M2 can be determined.

According to said angle 50, it will be possible to calculate the closing torque of the cap on the bottle and the calculated value can then be compared to a predetermined reference value (or value range).

In case of a bottling system including a capping station equipped with a plurality of capping apparatuses, it is possible to provide that the method according to the invention stores the values calculated for angle 50 between markers M1 and M2 and classifies them according to the specific capping apparatus used, so that the stored data can be used for purposes of calibration and maintenance of the different capping apparatuses.

Figure 2A:
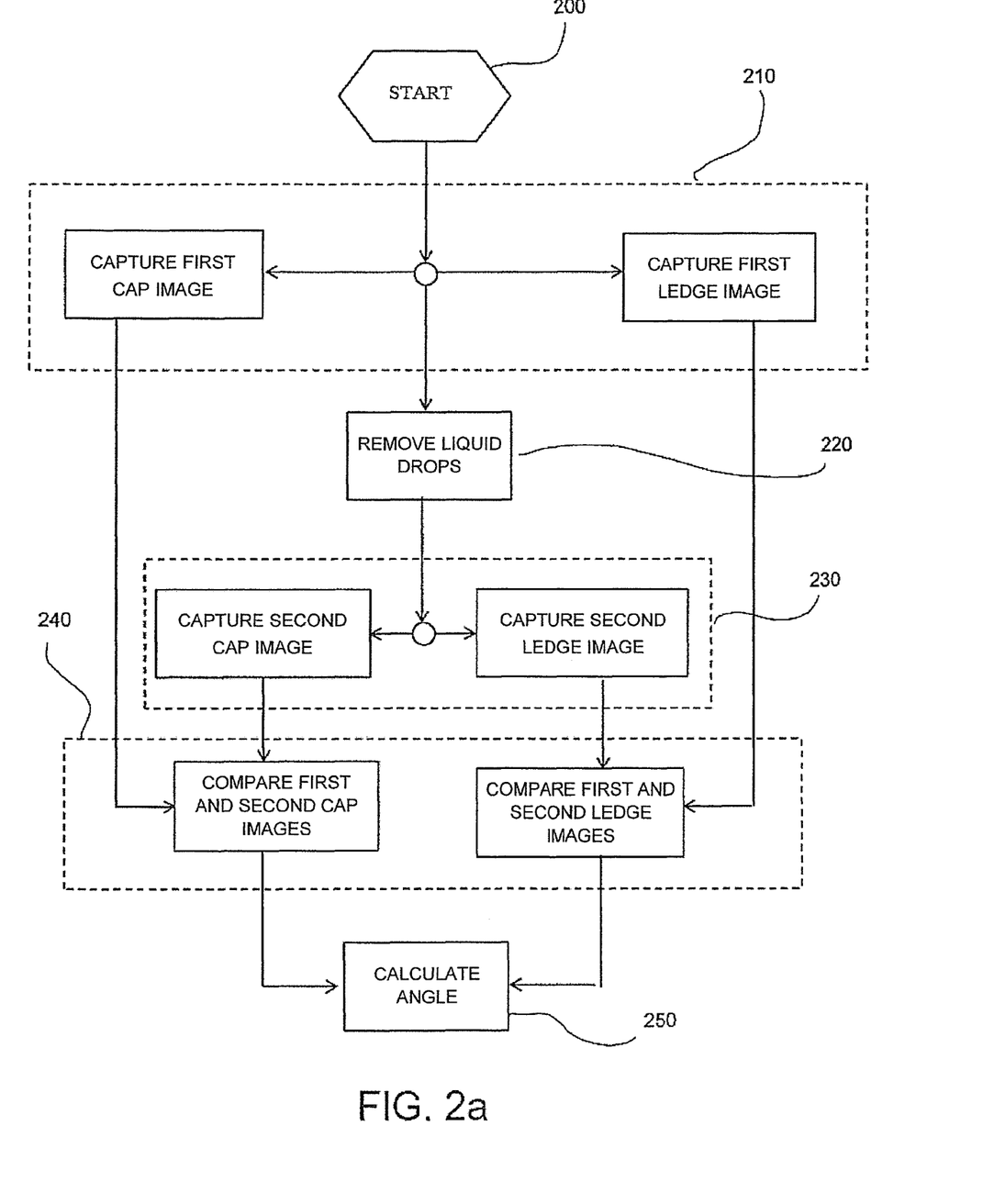
FIG. 2a is a block diagram illustrating the steps of the method for detecting the angular position of a cap with respect to a bottle according to a second embodiment of the invention.
Figure 2B:
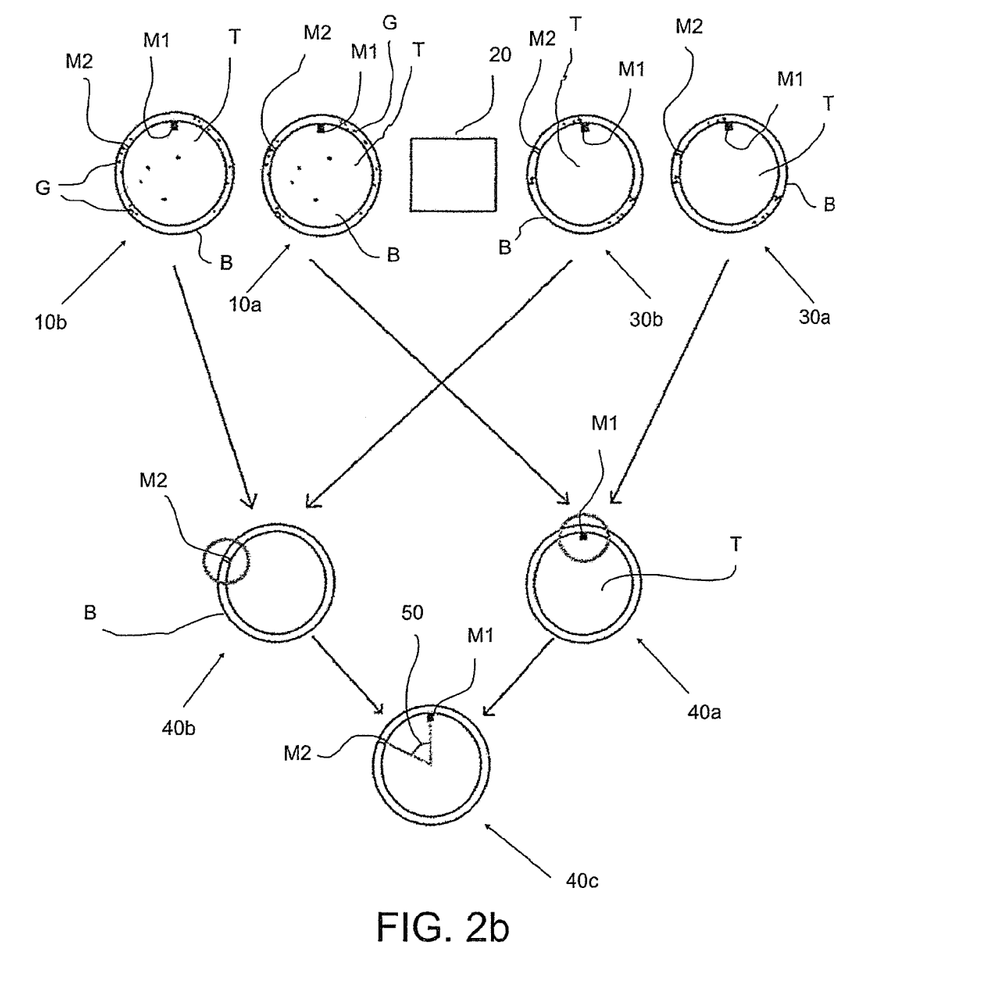
FIG. 2b shows, in the form of pictograms, the steps of the method shown in FIG. 2.

Turning now to FIGS. 2a and 2b, there is shown a second embodiment of the method according to the invention for detecting the angular position of a cap T with respect to the bottle on which it is applied.

Also in this embodiment, in a first step 200 of the method according to the invention, the process of detecting the angular position of cap T is started.

In a second step 210, a first image 10a of cap T and a separate first image 10b of ledge B of the bottle are captured.

Advantageously, the settings for capturing the first image 10a of cap T and the settings for capturing the first image 10b of ledge B of the bottle can be different and can be selected so as to optimise the capture of the respective markers M1, M2 provided on cap T and ledge B.

Indeed, since cap T and ledge B are made of different materials (e.g., transparent plastic material for the bottle, and white or coloured plastic material for the cap), selecting settings enabling an effective detection of both markers M1, M2 may be difficult.

Advantageously, in this embodiment, the first image 10a of cap T can be captured by using settings, in terms of exposure and integration time, which are optimal for detecting the first marker M1, and the first image 10b of the ledge can be captured with settings, in terms of exposure and integration time, which are different and optimal for detecting the second marker M2.

Also in this embodiment, according to the invention, in a third step 220 liquid drops G and the other impurities are removed from cap T and ledge B of the bottle, for instance by directing one or more air jets against said cap and said ledge.

In a fourth step 230, a second image 30a of cap T and a second image 30b of ledge B of the bottle are captured.

Also in this case, the second image 30a of the cap can be captured by using settings, in terms of exposure and integration time, which are optimal for detecting the first marker M1, and the second image 30b of the ledge can be captured by using settings, in terms of exposure and integration time, which are different and optimal for detecting the second marker M2.

In a fifth step 240, the first image 10a of cap T and the second image 30a of cap T are compared, and a first processing 40a of the image of cap T is generated. Similarly, the first image 10b of ledge B of the bottle and the second image 30b of ledge B of the bottle are compared, and a second processing 40b of the image of ledge B of the bottle is generated.

Thanks to the removal of the liquid drops and other impurities, any "noise" or interference in the detection of the position of the first marker M1 is wholly eliminated from the first processing 40a of the image of cap T. Similarly, any "noise" or interference in the detection of the position of the second marker M2 is wholly eliminated from the second processing 40b of the image of ledge B of the bottle.

Consequently, in a sixth step 250, the position of the first marker M1 on cap T and the position of the second marker M2 on ledge B of the bottle can be detected from a third processing 40c obtained by combining the first processing 40a and the second processing 40b, and angle 50 between said markers M1, M2 can be determined without risk of errors.

Also in this case, according to said angle 50, it will be possible to calculate the closing torque of cap T on the bottle and the calculated value can then be compared to a predetermined reference value (or value range).

Moreover, also in this case it will be possible to provide for a step of storage of the values calculated for angle 50 between markers M1 and M2, possibly classified depending on the specific capping apparatus used, so that the stored data can be used for purposes of calibration and maintenance of the different capping apparatuses.

From the above description, it will therefore be clearly apparent that the invention attains the object set above, since the step of removing the liquid drops and the other possible impurities from cap T and ledge B of the bottle allows eliminating (or at least drastically reducing) the errors in the detection of the correct positions of markers M1, M2 provided on said cap and said ledge and in the determination of the actual relative angular position thereof.

Figure 3:
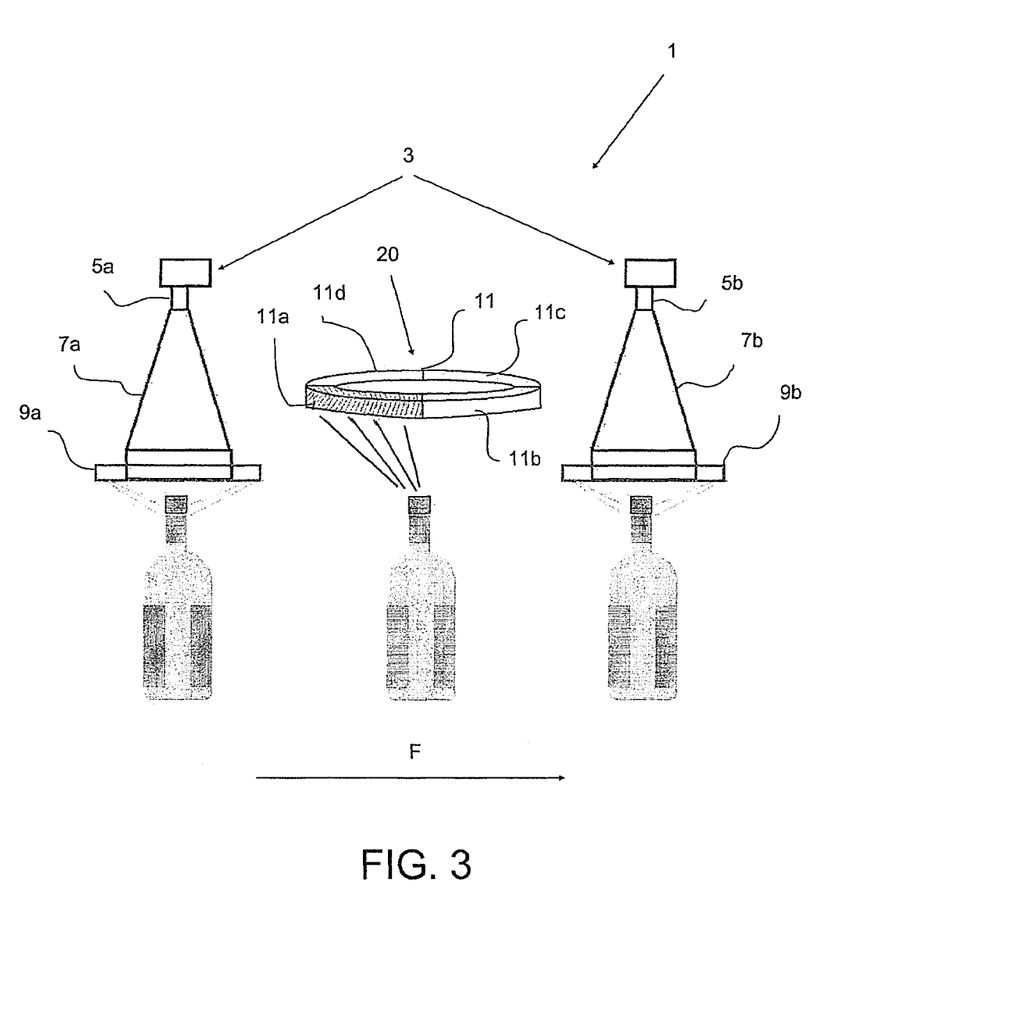
FIGS. 3 and 4 schematically show a possible embodiment of an apparatus for implementing the method of FIGS. 1a-1b and 2a-2b.
Figure 4:
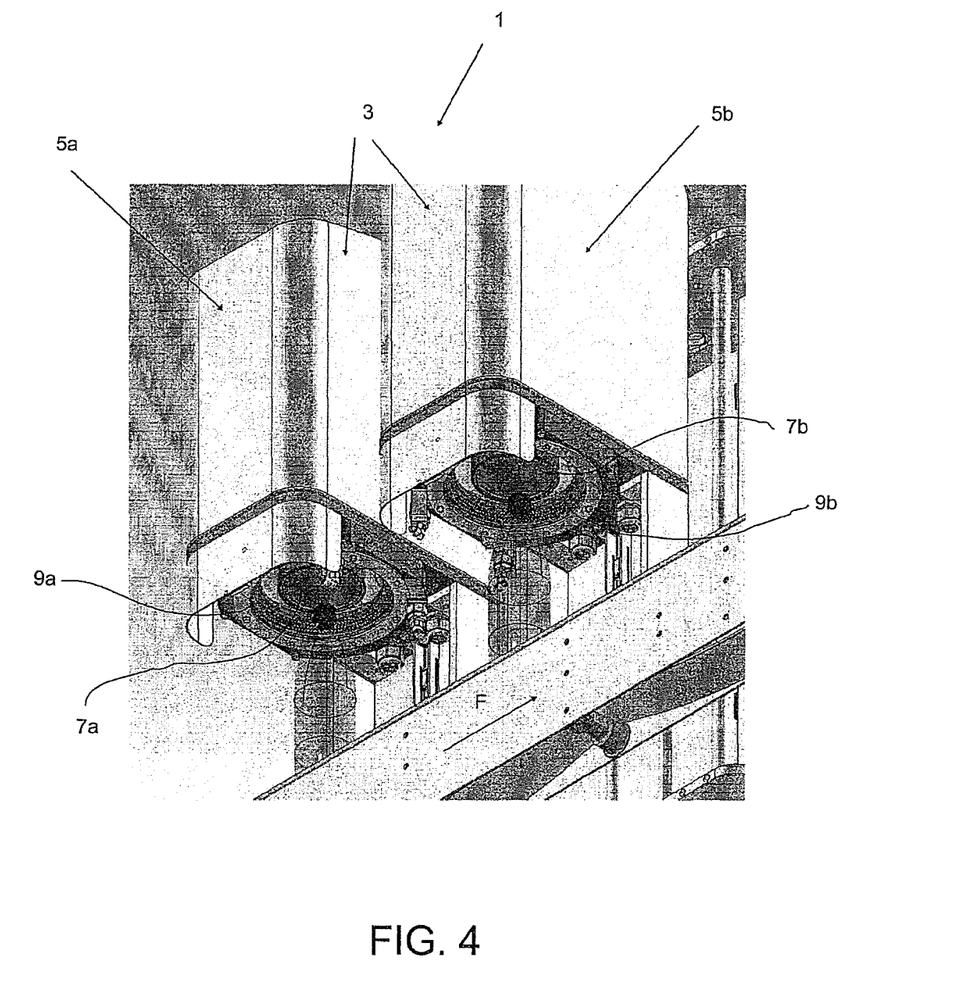

Turning now to FIGS. 3 and 4, there is shown, by way of example only, an embodiment of an apparatus 1 suitable to implement the method described above for detecting the angular position of a cap with respect to a bottle.

In the most general terms, said apparatus 1 includes: an image capturing device 3, comprising means for capturing at least one first image of cap T and ledge B of the bottle and for capturing also at least one second image of said cap T and said ledge B; a cleaning device 20, comprising means for removing liquid drops and other impurities from the surfaces of said cap T and said ledge B, and a processing unit (not shown), comprising means for processing the images captured by image capturing device 3, generating the corresponding processings and determining the relative angular position of each cap relative to the corresponding bottle by detecting the respective markers.

Said image capturing device 3 and said cleaning device 20 can have any structure and any operating manner within the reach of the skilled in the art.

In the embodiment illustrated, image capturing device 3 includes a first camera 5a arranged upstream of cleaning device 20 in the advance direction of the bottles (indicated by arrow F in the Figures) and a second camera 5b arranged downstream of said cleaning device 20 in said advance direction of the bottles.

Both the first camera 5a and the second camera 5b are provided with an optical system 7a, 7b by which it is possible to frame the side wall of the region of cap T and ledge B of the bottle from above and to capture an image in which both markers M1, M2 are simultaneously visible.

Moreover, both the first camera 5a and the second camera 5b are provided with a lighting system 9a, 9b. Said lighting system may comprise for instance a ring located above the bottles and provided with a plurality of light sources, preferably LEDs, even more preferably white LEDs.

In a first possible mode of use, the first camera 5a is arranged to capture a first image of cap T and ledge B with the respective markers before removal of the liquid drops and other possible impurities, and the second camera 5b is arranged to capture a second image of cap T and ledge B with the respective markers after removal of said liquid drops and other possible impurities.

In a second possible mode of use, the first camera 5a is arranged to capture a first image of cap T with the first marker and a separate first image of ledge B with the second marker before removal of the liquid drops and other possible impurities, and the second camera 5b is arranged to capture a second image of cap T with the first marker and a separate second image of ledge B with the second marker after removal of said liquid drops and other possible impurities.

In the latter case, the first and second cameras 5a, 5b are provided with a particular function (known as "cycling") that, upon a single actuation, allows capturing two different images at a very short time distance and possibly with different settings, in particular in terms of exposure and integration time.

Cleaning device 20 is preferably configured so as to perform cleaning of cap T and ledge B through a mechanical action and, more particularly, it includes one or more nozzles arranged to direct corresponding air jets against the surfaces of said cap and said ledge.

In the embodiment illustrated, said cleaning device 20 includes a ring structure 11 located above the bottles and provided with a plurality of nozzles arranged along the circumference of said ring structure and directed towards the cap and the ledge of the bottle below.

In a particularly preferred variant of this embodiment of the invention, the ring structure is divided into a plurality of sectors 11a-11d, and only the nozzles in a given sector are actuated every time in order to direct their air jets against the cap and the ledge of the bottle below.

To this end, the processing unit of apparatus 1 is arranged to determine an estimate of the positions of the markers according to the first image(s) only, and the nozzles of one or more specific sectors of ring structure 11 are actuated according to said estimate.

It will be clearly apparent to the skilled in the art that the apparatus described above is suitable to implement the method according to the invention.

Moreover, it will be clearly apparent to the skilled in the art that the embodiment described above has been given only by way of non-limiting example and that several changes and modifications within the reach of the skilled in the art are possible, without thereby departing from the scope of the invention as defined by the appended claims.

For instance, by providing a suitable optical system, it is possible to use a single camera that is capable of capturing both one or more first images of the cap and the ledge of the bottle upstream of the cleaning device, and one or more second images of the cap and the ledge of the bottle downstream of the cleaning device On the other hand, it is also possible to provide the image capturing device with separate cameras for capturing cap images and for capturing images of the ledge of the bottle (or of the different bottle portion in which the second marker is provided).

The invention claimed is:

1. A method for detecting the angular position of a cap with respect to a bottle on which the cap is applied, wherein a first marker is provided on the surface of the cap and a second marker is provided on the surface of a portion of the bottle, the method comprising the steps of:
    capturing at least one first image of the cap and the bottle portion;
    after said capturing step of the at least first image, removing from the surface of the cap and of the bottle portion and/or displacing relative to the surface of the cap and of the bottle portion liquid drops and other possible impurities existing on the cap and the bottle portion;
    after said removing step, capturing at least one second image of the cap and the bottle portion;
    comparing the at least one first image and the at least one second image of the cap and the bottle portion and generating at least one processing of the image of the cap and the bottle portion; and
    detecting the positions of the first and second markers in the at least one processing and determining the angle comprised between the markers.

2. The method according to claim 1, wherein a single first image including the cap and the bottle portion is captured and wherein a single second image including the cap and the bottle portion is captured.

3. The method according to claim 1, wherein a first image of the cap and a separate first image of the bottle portion are captured and wherein a second image of the cap and a separate second image of the bottle portion are captured.

4. The method according to claim 3, wherein the first image and the second image of the cap are captured upon selecting capturing parameters optimal for detecting the first marker and wherein the first image and the second image of the bottle portion are captured upon selecting capturing parameters optimal for detecting the second marker.

5. The method according to claim 1, wherein the liquid drops and the possible other impurities are removed and/or displaced by directing one or more air jets against the cap and the bottle portion.

6. The method according to claim 1, wherein the bottle portion is the ledge at the base of the neck of the bottle.

7. An apparatus for detecting the angular position of a cap with respect to a bottle on which the cap is applied and which is made to advance through the apparatus, a first marker being provided on the surface of the cap and a second marker being provided on the surface of a portion of the bottle, the apparatus comprising:
    a cleaning device, comprising means for removing from the surface of the cap and of the bottle portion and/or for displacing relative to the cap and the bottle portion liquid drops and possible other impurities,
    an image capturing device, comprising means for capturing at least one first image of the cap and the bottle portion upstream of the cleaning device in the advance direction of the bottle and at least one second image of the cap and the bottle portion downstream of the cleaning device in the advance direction of the bottle; and
    a processing unit, comprising means for comparing the at least one first image and the at least one second image of the cap and the bottle portion and for generating at least one corresponding image processing, for detecting the position of the first and second markers in the at least one processing and for determining the angle comprised between the markers.

8. The apparatus according to claim 7, wherein said image capturing device comprises a first camera arranged upstream of the cleaning device in the advance direction of the bottle and a second camera arranged downstream of the cleaning device in the advance direction of the bottle, and wherein the first and second cameras are each provided with a respective optical system.

9. The apparatus according to claim 8, wherein the first and second cameras are each provided with a respective lighting system, comprising a ring provided with a plurality of light sources.

10. The apparatus according to claim 8, wherein the first and second cameras are provided with a cycling function and are capable of capturing two different images at a time distance and with different settings.

11. The apparatus according to claim 7, wherein the cleaning device comprises a ring structure provided with a plurality of nozzles arranged along the circumference of the ring structure.

12. The apparatus according to claim 11, wherein the ring structure of the cleaning device is divided into a plurality of sectors and wherein one or more sectors are selectively activated according to an estimate of the positions of the markers, the estimate being carried out by the processing unit according to the at least one first image of the cap and the bottle portion captured by the image capturing device.

* * * * *